US00RE35361E

United States Patent [19]

Hogan et al.

[11] E Patent Number: Re. 35,361

[45] Reissued Date of Patent: Oct. 29, 1996

[54] EXPULSION OF DETRIMENTAL SUBSTANCE FROM THEFT-DETERRENT DEVICE

[75] Inventors: Dennis L. Hogan, St. Petersburg; John L. Lynch, Holiday; Lincoln H. Charlot, Jr., St. Petersburg, all of Fla.

[73] Assignee: Security Tag Systems, Inc., Boca Raton, Fla.

[21] Appl. No.: 954,905

[22] Filed: Sep. 30, 1992

Related U.S. Patent Documents

Reissue of:

[64] Patent No.: 5,054,172
Issued: Oct. 8, 1991
Appl. No.: 602,818
Filed: Oct. 24, 1990

[51] Int. Cl.[6] ..... A44B 9/00

[52] U.S. Cl. ..... 24/704.1; 70/57.1

[58] Field of Search ..... 24/704.1, 707.1, 24/706.8, 711.4, 711.5; 70/57.1; 340/572; 116/203, 212

[56] References Cited

U.S. PATENT DOCUMENTS

| | | |
|---|---|---|
| 2,804,029 | 8/1957 | Fitzgerald . |
| 4,483,049 | 11/1984 | Gustavsson et al. . |
| 4,590,461 | 5/1986 | Cooper . |
| 4,649,397 | 3/1987 | Heaton et al.. . |
| 4,670,950 | 6/1987 | Wisecap et al. . |
| 4,944,075 | 7/1990 | Hogan . |

FOREIGN PATENT DOCUMENTS

WO9204705 3/1992 WIPO .

*Primary Examiner*—James R. Brittain
*Attorney, Agent, or Firm*—Edward W. Callan

[57] ABSTRACT

In a device for deterring theft of a protected article, including a pin and clutch respectively embodied in two components that are adapted to be locked together on opposite sides of a portion of the protected article to prevent unauthorized removal of the device from the article, the pin-containing component contains two fragile elongated glass vials that fracture when at least a predetermined pressure is applied thereto, with the vials containing a detrimental substance that would damage an article attached to the device if such substance were to be released from the vial; and the head of the pin includes a breaker element having a wedge-shaped surface of a fiber-loaded-reinforced thermoplastic, (which does not scratch glass), for applying more than the predetermined pressure against the vial in response to the pinhead being moved in response to application to the two components of at least a predetermined threshold separation force, to thereby completely fracture the vials by inducing a high bending stress without prematurely cracking the vials, and to thereby release the substance contained therein before the components are separated by prying or pulling the components apart. A pliable seal is disposed between the breaker element and the vials for preventing the detrimental substance that is released from the fractured vials from entering the head space and for expelling the released detrimental substance through the adjacent opening in response to pressure applied against the seal by the breaker element by the movement of the pinhead that results in the vials being fractured.

25 Claims, 2 Drawing Sheets

EXPULSION OF DETRIMENTAL SUBSTANCE FROM THEFT-DETERRENT DEVICE

Matter enclosed in heavy brackets [ ] appears in the original patent but forms no part of this reissue specification; matter printed in italics indicates the additions made by reissue.

BACKGROUND OF THE INVENTION

The present invention is generally directed to devices that may be attached to articles, such as merchandise, for deterring the theft of such articles, and is particularly directed to improvements in a theft-deterrent device of the type that contains a detrimental substance that damages a protected article attached to the device by releasing such substance when the device is tampered with during an unauthorized attempt to remove the device from the article.

Typically, the device includes means for attaching the device to the article, with the attaching means being embodied in two components that are adapted to be locked together on opposite sides of a portion of said article to prevent unauthorized removal of the device from the article. A typical attaching means includes a pin having a head embodied in one of the two components and means embodied in the other component for receiving the free end of the pin. The device is attached to the protected article by passing the free end of the pin through a portion of the article. At least one of the two components includes a fragile elongated vial that fractures when flexed longitudinally, with said vial containing the detrimental substance that would damage the article if the vial were to be fractured while the device was attached to the article.

Prior art devices of this nature are described in U.S. Pat. Nos. 4,483,049 to Gustavsson et al., 4,670,950 to Wisecup et al. and 4,649,397 to Heaton et al. Typically, these devices are used to discourage the theft of such articles of merchandise as clothing, and the detrimental substance typically is an ink or dye or foul-smelling substance that permanently stains and or fouls the clothing so as to make the clothing unattractive and thereby generally unfit for wear.

In both the device described in U.S. Pat. No. 4,483,049 and the device described in U.S. Pat. No. 4,670,950, a detrimental substance is contained in two frangible vials that are respectively disposed in two opposing components that are secured together on opposite sides of a portion of the protected article when the device is locked to the article.

In the device described in U.S. Pat. No. 4,483,049, the vials fracture when severely contacted by a tool, such as a screw driver, that typically would be used in an attempt to pry apart the opposing components of the device so that the device could be removed from the protected article. The vials are so disposed in the device as to be readily contacted by a tool being used to pry apart the object and thereby fracture to release the detrimental substance onto an protected article locked to the device.

In the device described in U.S. Pat. No. 4,670,950, the frangible vials are longitudinally disposed in the two opposing elongated components so that when either component is flexed longitudinally during an attempt to pry the two components apart, the vial contained therein fractures to release the detrimental substance onto an protected article locked to the device.

In the device described in U.S. Pat. No. 4,649,397, two frangible vials are longitudinally disposed in one of two opposing elongated components so that when such component is flexed longitudinally during an attempt to pry the two components apart, the vials contained therein fracture to release the detrimental substance onto an protected article locked to the device. Such device further contains an electronic article surveillance tag of the type described in U.S. Pat. No. 4,481,428 to Lincoln H. Charlot, Jr.

Another prior art detrimental-substance-containing theft-deterrent device having a vial that will fracture to release the detrimental substance whenever a forceful attempt is made to detach the theft-deterrent device from the article to be protected, is described in U.S. Pat. No. 4,944,075 to Dennis L. Hogan. In such device, an attachment-pin-containing component having openings in a surface through which the pin passes for engagement with the other component includes a plurality of fragile elongated detrimental-substance-containing vials that fracture when at least a predetermined pressure is applied thereto; and defines a head space for enabling limited axial movement of the pinhead, and guide channels containing balls between the pinhead and the vials. The guide channels are contoured for enabling the pinhead to force the balls to move and apply more than said predetermined pressure against the vial in response to the pinhead being moved in response to application to the two components of at least a predetermined threshold separation force that is nevertheless less than that required to overcome the retaining force between the pin and the clutch, to thereby fracture at least one of the vials to release the substance contained therein through the openings and onto the article attached to the device before the components are separated by prying or pulling the components apart.

SUMMARY OF THE INVENTION

The present invention provides an improvement to the detrimental-substance-containing component of the theft-deterrent device described in the aforementioned U.S. Pat. No. 4,944,075 to Hogan that enhances expulsion of the detrimental substance from the detrimental-substance-containing component once any one of the vials is fractured.

In one aspect, the present invention provides a detrimental-substance-containing component for use in a theft-deterrent device that includes means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental-substance-containing component and a clutch contained in the other component for grasping the pin to provide a predetermined retaining force for resisting separation of the components by prying or pulling the components apart, wherein the detrimental-substance-containing component includes a surface through which the pin passes for engagement with the other component, wherein said surface contains at least one opening; wherein the detrimental-substance-containing component includes at least one fragile vial that fractures when at least a predetermined pressure is applied thereto, with said vial being disposed adjacent said at least one opening and containing a detrimental substance that would damage an article attached to the device if the vial were to be fractured and the detrimental substance were to be released from the fractured vial through said at least one opening onto the attached article; wherein the detrimental-substance-containing component defines a head space for enabling limited axial movement of the pinhead; wherein the pinhead includes a breaker element having a contoured surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the detrimental-substance-containing component includes a pliable seal disposed between the breaker element and the vial for preventing the detrimental substance that is released from the fractured vial from entering the head space and for expelling the released detrimental substance through said at least one opening in response to pressure applied against the seal by the breaker element by said movement of the pinhead that results in the vial being fractured.

Accordingly, the detrimental substance is expelled from the detrimental-substance-containing component and onto the article attached to the theft device even though the theft-deterrent device is oriented such that the detrimental-substance-containing component is positioned beneath the other component at the time when the vial is fractured; whereas except for the positive expulsion of the detrimental substance provided by the present invention, the force of gravity would retain the detrimental substance within the detrimental-substance-containing component.

Expulsion of the detrimental substance is further improved in a preferred embodiment in which the seal is more extensive than the breaker element; and in which the pinhead further includes a flange extending beyond the breaker element for contacting the seal beyond the breaker element for further forcing the seal to expel the released detrimental substance through said at least one opening in response to pressure applied against the seal by the flange by said movement of the pinhead that results in the vial being fractured.

In a second aspect, the present invention provides a detrimental-substance-containing component for use in a theft-deterrent device that includes means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental-substance-containing component and a clutch contained in the other component for grasping the pin to provide a predetermined retaining force for resisting separation of the components by prying or pulling the components apart, wherein the detrimental-substance containing component includes at least one fragile vial that fractures when at least a predetermined pressure is applied thereto, with said vial containing a detrimental substance that would damage an article attached to the device if the vial were to be fractured and the detrimental substance were to be released from the fractured vial onto the attached article; wherein the detrimental-substance-containing component defines a head space for enabling limited axial movement of the pinhead; wherein the pinhead includes a breaker element disposed on the pin so as to move parallel to the axial movement of the pinhead and having a wedge-shaped surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the vial is elongated with closed ends and is disposed in relation to the pinhead such that the breaker element can apply pressure to induce a high bending stress in the vial and thereby completely fracture the vial.

It has been found that if during the process of fracturing the vial, the breaker element induces a high bending stress in the vial without causing premature cracking, the vial will fracture completely; whereas if either the high bending stress is not induced or premature cracking occurs, the vial does not fracture completely. Such incomplete fracturing of the vial sometimes results in the fractured portions of the vial collapsing into the remaining portions of the vial in such a manner as to prevent a large portion of the detrimental substance from being expelled from the vial.

Premature cracking of the vial may occur if the vial is scratched such that minute high pressure points occur when pressure is applied by the breaker element.

To prevent scratching of the vial in those embodiments of the detrimental-substance-containing component of this second aspect of the present invention, as described above, in which the breaker element can contact the vial, the surface of the breaker element that applies the pressure against the vial is made of a smooth, rigid material that does not scratch the vial.

In a preferred embodiment of this second aspect of the present invention, in which the vial is made of glass, the surface of the breaker element that applies the pressure against the vial is made of a fiber-loaded-reinforced thermoplastic material, such as glass-fiber-loaded nylon.

Both of the aforementioned aspects of the invention are combined in the preferred embodiment of the present invention to still further enhance expulsion of the detrimental substance from the detrimental-substance-containing component.

The present invention further provides theft-deterrent devices containing an improved detrimental-substance-containing component according to the present invention.

Additional features of the present invention are described in relation to the description of the preferred embodiment.

DESCRIPTION OF THE PREFERRED EMBODIMENT

Figure 1:
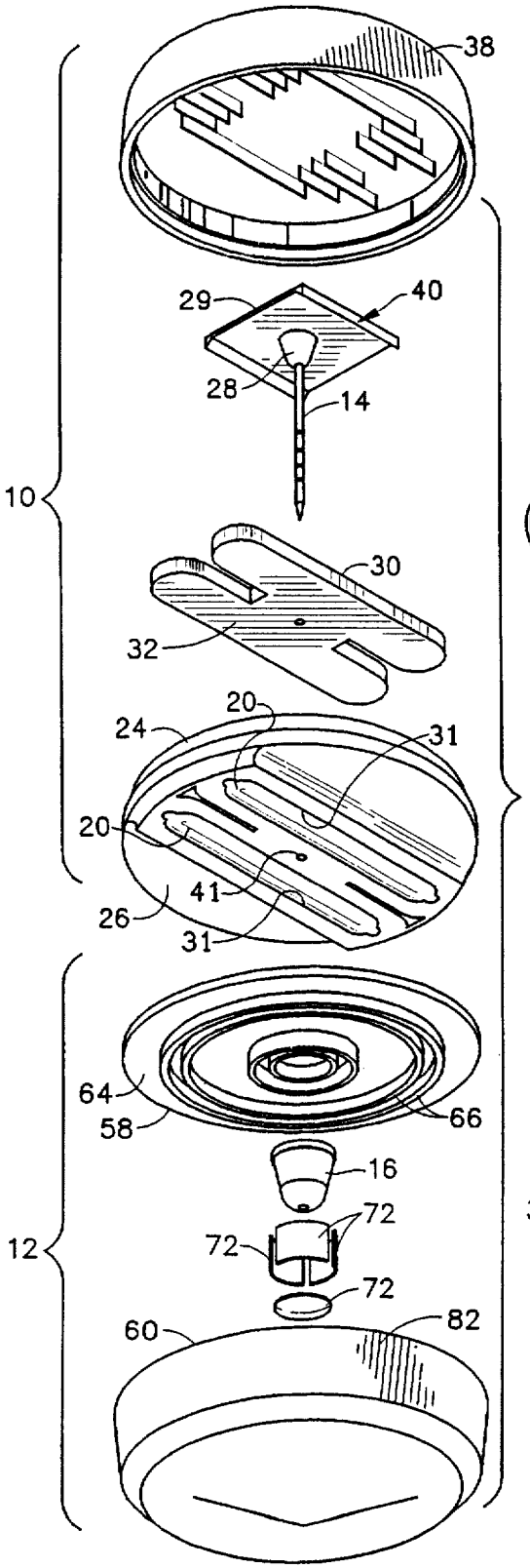
FIG. 1 is an exploded perspective view of a preferred embodiment of the theft-deterrent device of the present invention.
Figure 2:
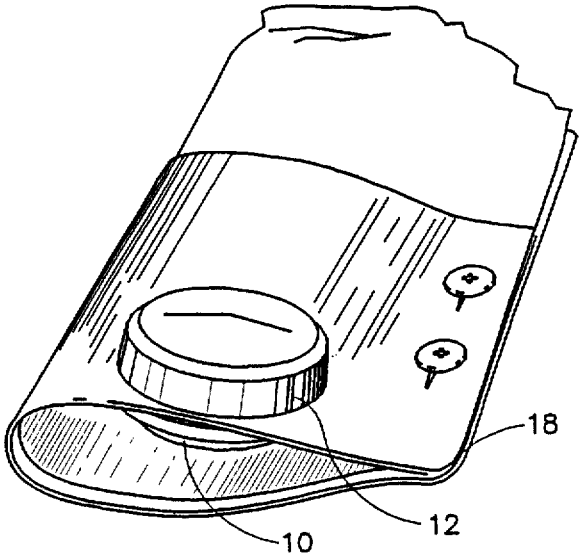
FIG. 2 illustrates the attachment of the theft-deterrent device of FIG. 1 to a protected article or clothing.
Figure 3:
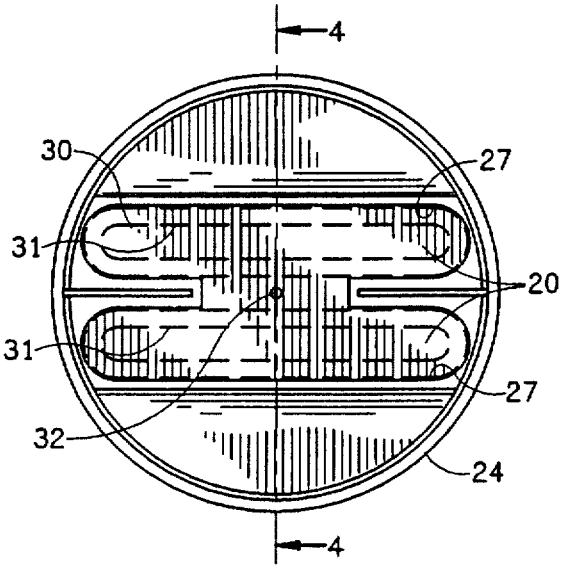
FIG. 3 is a top plan view of a member of the one component of the theft-deterrent device of FIG. 1 that contains the vials and the seal and anchors the pin.

Referring to FIG. 1, a preferred embodiment of the theft-deterrent device of the present invention includes a first component 10 and a second component 12. The first component 10 includes a pin 14, and the second component 12 includes a clutch 16 for grasping the pin 14. The pin 14 is centrally located in the first component 10; and the clutch 16 is centrally located in the second component 12. The theft-deterrent device is attached to an article 18 to be protected (as illustrated in FIG. 2) by passing the pin 14 through a portion of the protected article 18 and engaging the pin 14 in the clutch 16 so that the clutch 16 grasps the pin 14. While the pin 16 is grasping the pin 14, the first component 10 and the second component 12 are locked together on opposite sides of a portion of the protected article 18 and thereby prevent unauthorized removal of the theft-deterrent device from the protected article 18. The pin 14 has a head 40 that is anchored within the first component 10; and the clutch 16 in the second component 12 gasps the pin 14 to provide a predetermined retaining force, such as 100 pounds (25 newtons), for resisting separation of the components 10, 12 by prying or pulling the components apart. The predetermined retaining force must be much greater than the separation force that would be applied in attempting to separate the two components 10, 12 by using one's bare hands.

The pin 14, the clutch 16 and the technique of releasing the pin 14 from the grasp of the clutch 16 so that the first component 10 can be unlocked from the second component 12 to thereby detach the protected article 18 from the theft-deterrent device are described in U.S. Pat. No. 4,523,356 to Lincoln H. Charlot, Jr.

Referring to FIGS. 1, 3, 4A and 4B, the first component 10 includes a member 24 that contains two fragile elongated glass vials 20 that fracture when at least a predetermined pressure is applied thereto. Each vial 20 contains a detrimental substance 22 that would damage the protected article 18 if the vial were to be fractured while the theft-deterrent device was attached to the article 18. The detrimental substance 22 preferably is a fluid colored dye or permanent ink.

The first component 10 includes a plastic vial-containing member 24 and a circular plastic cover 38. The member 24 is ultrasonically welded to the cover 38 at the circumferential edge of the member 24.

The member 24 and the cover 38 define a head space 25 in which the pinhead 40 is anchored. The head space 25 also enables limited axial movement of the pinhead 40. The pin 14 passes through a hole 41 in an exposed surface 26 of the member 24.

The exposed surface 26 of the member 24 further includes openings 31 into two chambers 27 defined by the member 24 for respectively disposing the two vials 20 adjacent such openings 31. The openings 31 are smaller than the vials 20 so as to recess the vials 20 from the exposed surface 26 and thereby prevent the vials 20 from being fractured during normal handling of the component 10.

The pinhead 40 includes a breaker element 28 and a flange 29.

The breaker element 28 exerts little or no pressure on the vials 20 while the attached pin 14 and clutch 16 are in a relaxed state, which occurs when no force is being applied to separate the two components 10, 12.

The breaker element 28 has a wedge-shaped surface for applying more than the predetermined pressure against the vials 20 in response to the pinhead 40 being moved in response to application to the two components 10, 12 of at least a predetermined threshold separation force, such as approximately 40 pounds (10 newtons), that is nevertheless less than that required to overcome the predetermined retaining force, to thereby fracture the vials 20 and release the substance 22 contained therein before the components 10, 12 are separated by prying or pulling the components apart. The predetermined threshold separation force must be well above both normal handling forces for the theft-deterrent device and the separation force that would be applied in attempting to separate the two components 10, 12 by using one's bare hands; and but yet, the predetermined threshold separation force must be easily attained by attempting to pry the two components 10, 12 apart with a screwdriver.

The vials 20 are elongated with closed ends and are disposed in relation to the pinhead 40 such that the breaker element 28 can apply pressure to induce a high bending stress in the vials 20 and thereby completely fracture the vials 20.

The surface of the breaker element 28 that applies the pressure against the vials 20 is made of a smooth, rigid material that does not scratch the vial 20. In the preferred embodiment, the vials 20 are made of glass; and the surface of the breaker element 28 that applies the pressure against the vial 20 is made of a fiber-loaded-reinforced thermoplastic material, such as glass-fiber loaded nylon.

The vials 20 are symmetrically disposed in relation to the pinhead 40 so that the pinhead 40 applies approximately equal pressure to both vials 20.

A pliable seal 30 is disposed between the breaker element 28 and the vials 20. The seal 30 includes a hole 32 through which the pin 14 passes. The pliable seal 30 is disposed between the breaker element 28 and the vials 20 for preventing the detrimental substance 22 that is released from the fractured vials 20 from entering the head space 25 and for expelling the released detrimental substance 22 through the openings 31 in response to pressure applied against the seal 30 by the breaker element by said movement of the pinhead that results in the vial being fractured. The pliable seal 30 preferably is rubber, such as foam rubber or latex sheet material. The foam rubber flows has the advantage of flowing around the glass particles of the fractured vials 20.

The seal 30 is more extensive than the breaker element 28; and the flange 29 of the pinhead 40 extends beyond the breaker element for contacting the seal 30 beyond the breaker element 28 for further forcing the seal 30 to expel the released detrimental substance 22 through the openings 31 in response to pressure applied against the seal 30 by the flange 29 by the movement of the pinhead 40 that results in the vials 20 being fractured.

The seal 30 also serves as a shock absorbers for the vials 20 in order to prevent the vials 20 from being broken during normal handling of the component 10.

Figure 4A:
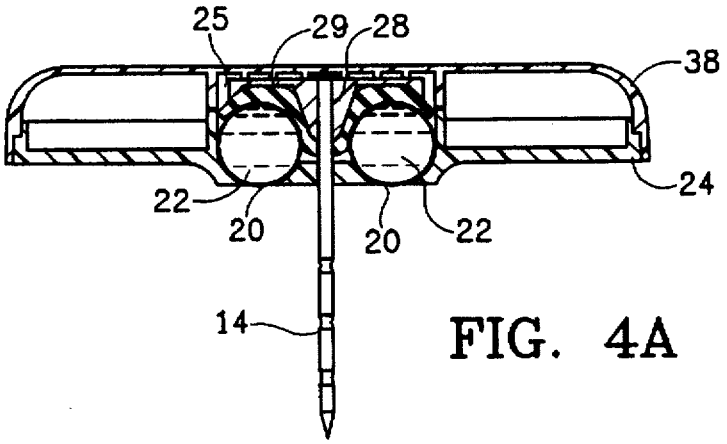
FIGS. 4A and 4B are sector sectional views of the detrimental-substance-containing component of the theft-deterrent device of FIG. 1 taken along lines 4—4 in FIG. 3, showing a sequence of operation as the breaker element of the pinhead moves to fracture the vials in response to the pin being forced downward.
Figure 4B:
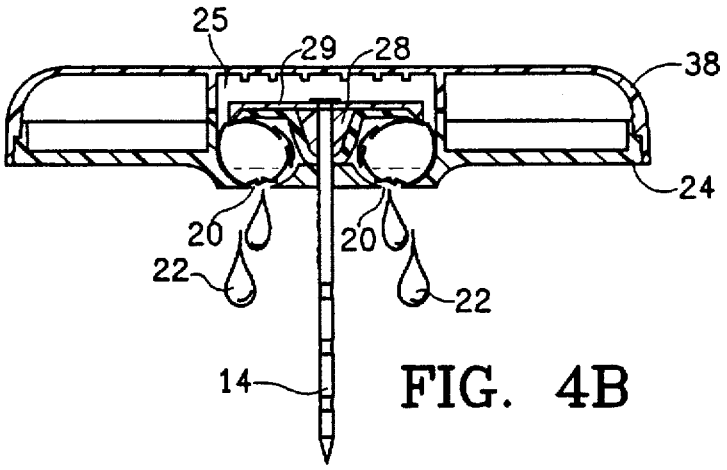

When forced separation of the two components 10, 12 is attempted, the pin 14 is forced to move axially within the vial-containing member 24 and the breaker element 28 of the pinhead 40 applies pressure against the vials 20 to fracture the vials 20, as illustrated in FIGS. 4A and 4B. The pinhead 40 is shown in the relaxed position in FIG. 4A and is shown in the position in which the vials 20 are fractured in response to downward movement of the pinhead 40 in FIG. 4B. The second component 12 also is so structured as not to flex when an attempt is made to pry the first component 10 from the second component 12 while the two components are locked together, thereby concentrating separation forces resulting from said prying to be applied to forcing movement of the pinhead 40 within the member 24 of the first component 10.

Figure 5:
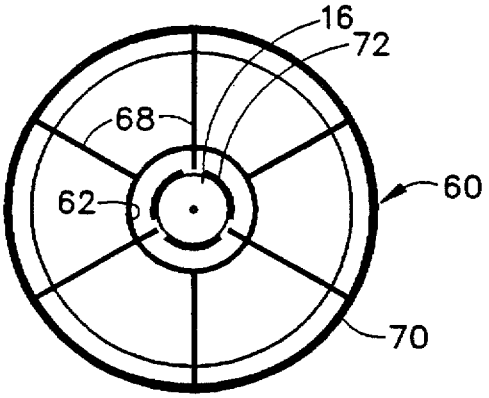
FIG. 5 is a top plan view of the barrel of the second component of the theft-deterrent device of FIG. 1.
Figure 6:
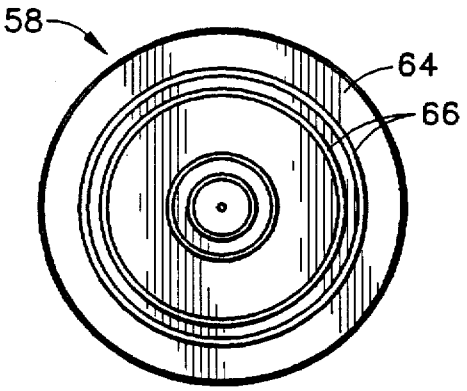
FIG. 6 is a bottom plan view of the cover of the second component of the theft-deterrent device of FIG. 1.

Referring to FIGS. 5 and 6, the second component 12 includes a plastic cover 58 and a plastic barrel 60. The barrel 60 includes a central chamber 62 that holds the housing of the clutch 16. In order to make the second component 12 rigid so that it does not flex, the concealed surface 64 of the cover 12 includes a plurality of circular stiffening ribs 66; and the barrel 60 includes a plurality of supporting struts 68 extending radially between the central chamber 62 and the outer wall 70 of the barrel 60.

The second component 12 also includes deflection plates 72 made of two-percent-carbon hardened spring steel, which line the central chamber 62 around the clutch 16 for deflecting the bit of a drill that one might use in an attempt to penetrate the housing of the clutch 16, and thereby shield the housing of the clutch 16 from a drilling tool.

The barrel 60 is ultrasonically welded to the cover 58 at the circumferential edge of the cover 58 and at the upper edge of the central chamber 62.

We claim:

1. A detrimental-substance-containing component of a device for deterring theft of a protected article, the device comprising means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental-substance-containing component and a clutch contained in the other component for grasping the pin to provide a pre-determined retaining force for resisting separation of the components by prying or pulling the components apart, wherein the detrimental-substance-containing component includes a surface through which the pin passes for engagement with the other component, wherein said surface contains at least one opening;

wherein the detrimental-substance-containing component includes at least one fragile vial that fractures when at least a predetermined pressure is applied thereto, with said vial being disposed adjacent said at least one opening and containing a detrimental substance that would damage an article attached to the device if the vial were to be fractured and the detrimental substance were to be released from the fractured vial through said at least one opening onto the attached article;

wherein the detrimental-substance-containing component defines a head space for enabling limited axial movement of the pinhead;

wherein the pinhead includes a breaker element having a contoured surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the detrimental-substance-containing component includes a pliable seal disposed between the breaker element and the vial for preventing the detrimental substance that is released from the fractured vial from entering the head space and for expelling the released detrimental substance through said at least one opening in response to pressure applied against the seal by the breaker element by said movement of the pinhead that results in the vial being fractured.

2. A component according to claim 1, wherein the seal is more extensive than the breaker element; and wherein the pinhead further includes a flange extending beyond the breaker element for contacting the seal beyond the breaker element for further forcing the seal to expel the released detrimental substance through said at least one opening in response to pressure applied against the seal by the flange by said movement of the pinhead that results in the vial being fractured.

3. A component according to claim 1, wherein the contour of the breaker element is wedge-shaped; and wherein the vial is elongated with closed ends and is disposed in relation to the pinhead such that the breaker element can apply pressure to induce a high bending stress in the vial and thereby completely fracture the vial.

4. A component according to claim 3, wherein the surface of the breaker element that applies said pressure against the vial is made of a smooth, rigid material that does not scratch the vial.

5. A component according to claim 3, wherein the vial is made of glass; and wherein the surface of the breaker element that applies said pressure against the vial is made of a smooth, rigid fiber-loaded-reinforced thermoplastic material that does not scratch glass.

6. A component according to claim 3, comprising a plurality of said vials symmetrically disposed in relation to the breaker element of the pinhead.

7. A detrimental-substance-containing component of a device for deterring theft of a protected article, the device comprising means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental-substance-containing component and a clutch contained in the other component for grasping the pin to provide a predetermined retaining force for resisting separation of the components by prying or pulling the components apart, wherein the detrimental-substance-containing component includes at least one fragile vial that fractures when at least a predetermined pressure is applied thereto, with said vial containing a detrimental substance that would damage an article attached to the device if the vial were to be fractured and the detrimental substance were to be released from the fractured vial onto the attached article;

wherein the detrimental-substance-containing component defines a head space for enabling limited axial movement of the pinhead;

wherein the pinhead includes a breaker element disposed on the pin so as to move parallel to the axial movement of the pinhead and having a wedge-shaped surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the vial is elongated with closed ends and is disposed in relation to the pinhead such that the breaker element can apply pressure to induce a high bending stress in the vial and thereby completely fracture the vial.

8. A component according to claim 7, wherein the surface of the breaker element that applies said pressure against the vial is made of a smooth, rigid material that does not scratch the vial.

9. A component according to claim 7, wherein the vial is made of glass; and wherein the surface of the breaker element that applies said pressure against the vial is made of a smooth, rigid fiber-loaded-reinforced thermoplastic material that does not scratch glass.

10. A component according to claim 7, comprising a plurality of said vials symmetrically disposed in relation to the breaker element of the pinhead.

11. A device for deterring theft of a protected article, comprising means for attaching the device to the article, with said attaching means being embodied in two components that are adapted to be locked together on opposite sides of a portion of said article to prevent unauthorized removal of the device from the article, wherein the attaching means include a pin having a head that is anchored within one component and a clutch contained in the other component for grasping the pin to provide a predetermined retaining force for resisting separation of the components by prying or pulling the components apart;

wherein said one component includes a surface through which the pin passes for engagement with the other component, wherein said surface contains at least one opening;

wherein said one component includes at least one fragile vial that fractures when at least a predetermined pressure is applied thereto, with said vial being disposed adjacent said at least one opening and containing a detrimental substance that would damage an article attached to the device if the vial were to be fractured and the detrimental substance were to be released from the fractured vial through said at least one opening onto the attached article;

wherein said one component defines a head space for enabling limited axial movement of the pinhead;

wherein the pinhead includes a breaker element having a contoured surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the one component further includes a pliable seal disposed between the breaker element and the vial for preventing the detrimental substance that is released from the fractured vial from entering the head space and for expelling the released detrimental substance through said at least one opening in response to pressure applied against the seal by the breaker element by said movement of the pinhead that results in the vial being fractured.

12. A device according to claim 11, wherein the seal is more extensive than the breaker element; and wherein the pinhead further includes a flange extending beyond the breaker element for contacting the seal beyond the breaker element for further forcing the seal to expel the released detrimental substance through said at least one opening in response to pressure applied against the seal by the flange by said movement of the pinhead that results in the vial being fractured.

13. A device according to claim 11, wherein the contour of the breaker element is wedge-shaped; and wherein the vial is elongated with closed ends and is disposed in relation to the pinhead such that the breaker element can apply pressure to induce a high bending stress in the vial and thereby completely fracture the vial.

14. A device according to claim 13, wherein the surface of the breaker element that applies said pressure against the vial is made of a smooth, rigid material that does not scratch the vial.

15. A device according to claim 13, wherein the vial is made of glass; and wherein the surface of the breaker element that applies said pressure against the vial is made of a smooth, rigid fiber-loaded-reinforced thermoplastic material that does not scratch glass.

16. A device according to claim 13, comprising a plurality of said vials symmetrically disposed in relation to the breaker element of the pinhead.

17. A device for deterring theft of a protected article, comprising means for attaching the device to the article, with said attaching means being embodied in two components that are adapted to be locked together on opposite sides of a portion of said article to prevent unauthorized removal of the device from the article, wherein the attaching means include a pin having a head that is anchored within one component and a clutch contained in the other component for grasping the pin to provide a predetermined retaining force for resisting separation of the components by prying or pulling the components apart;

wherein said one component includes at least one fragile vial that fractures when at least a predetermined pressure is applied thereto, with said vial containing a detrimental substance that would damage an article attached to the device if the vial were to be fractured and the detrimental substance were to be released from the fractured vial onto the attached article; p1 wherein said one component defines a head space for enabling limited axial movement of the pinhead;

wherein the pinhead includes a breaker element disposed on the pin so as to more parallel to the axial movement of the pinhead and having a wedge-shaped surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and wherein the vial is elongated with closed ends and is disposed in relation to the pinhead such that the breaker element can apply pressure to induce a high bending stress in the vial and thereby completely fracture the vial.

18. A device according to claim 17, wherein the surface of the breaker element that applies said pressure against the vial is made of a smooth, rigid material that does not scratch the vial.

19. A device according to claim 17, wherein the vial is made of glass; and wherein the surface of the breaker element that applies said pressure against the vial is made of a fiber-loaded-reinforced thermoplastic material.

20. A device according to claim 17, comprising a plurality of said vials symmetrically disposed in relation to the breaker element of the pinhead.

*21. A detrimental-substance-containing component of a device for deterring theft of a protected article, the device comprising means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental- substance-containing component and a clutch contained in the other component for grasping the pin to provide a predetermined retaining force for resisting separation of the components by prying or pulling the components apart,*

*wherein the detrimental-substance-containing component includes a surface through which the pin passes for engagement with the other component, wherein said surface contains at least the opening;*

*wherein the detrimental-substance-containing component includes at least one fragile vial that fractures when at least a predetermined pressure is applied thereto, with said vial being disposed adjacent said at least one opening and containing a detrimental substance that would damage an article attached to the device if the vial were to be fractured and the detrimental substance were to be released from the fractured vial through said at least one opening onto the attached article;*

*wherein the detrimental-substance-containing component defines a head space for enabling limited axial movement of the pinhead;*

*wherein the pinhead includes a surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and*

*wherein the detrimental-substance-containing component includes a pliable seal disposed between the pinhead and the vial for preventing the detrimental substance that is released from the fractured vial from entering the head space and for expelling the released detrimental substance through said at least one opening in response to pressure applied against the seal by the pinhead by said movement of the pinhead that results in the vial being fractured.*

*22. A detrimental-substance-containing component of a device for deterring theft of a protected article, the device comprising means for attaching the device to the article, with said attaching means being embodied in two components that are adapted to be locked together on opposite sides of a portion of said article to prevent unauthorized removal of the device from the article, wherein the attaching means include a pin having a head that is anchored within the detrimental- substance-containing component and a clutch contained in the other component for grasping the pin to provide a predetermined retaining force for resisting separation of the components by prying or pulling the components apart,*

*wherein the detrimental-substance-containing component includes at least one fragile vial that fractures when at least a predetermined pressure is applied thereto, with said vial containing a detrimental substance that would damage an article attached to the device if the vial were to be fractured and the detrimental substance were to be released from the fractured vial onto the attached article;*

*wherein the detrimental-substance-containing component defines a head space for enabling limited axial movement of the pinhead;*

*wherein the pinhead has a surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart;*

*wherein the vial is elongated with closed ends and is disposed in relation to the pinhead such that the pinhead can apply pressure to induce a high bending stress in the vial and thereby completely fracture the vial; and*

*wherein the surface that applies said pressure against the vial is made of a smooth, rigid material that does not scratch the vial.*

*23. A component according claim 22, wherein the vial is made of glass; and*

*wherein the surface thai applies said pressure against the vial is made of a smooth, rigid fiber-loaded-reinforced thermoplastic material that does not scratch glass.*

*24. An article-protecting theft deterrent including a first element which comprises a base element, an elongated, generally pin-shaped or needle-shaped connecting element which projects from said base element and which is intended for insertion through said article, and a second element comprising a head which is intended for attachment to the connecting element and which is locked on said connecting element against movement away from the base element so as to hold the theft deterrent on said article, wherein the base element is provided with a fragile, tubular ampule which contains a staining substance and which is intended to fracture when the connecting element is manipulated, such as to release the staining substance from said ampule, characterized in that the ampule is supported at both ends thereof against movement in a direction away from the base element; and in that the connecting element includes an abutment part which is integral to the connecting element and located on that side of the ampule which is opposite to said direction and which is intended to come into engagement with the ampule when an attempt is made to manipulate the connecting element.*

*25. A detrimental-substance-containing component of a device for deterring theft of a protected article, the device comprising means for attaching the device to the article, with said attaching means being embodied in two compo-*

*nents that are adapted to be locked together on opposite sides of a portion of said article to prevent unauthorized removal of the device from the article, wherein the attaching means include a pin having a head that is anchored within the detrimental-substance-containing component and a clutch contained in the other component for grasping the pin to provide a predetermined retaining force for resisting separation of the components by prying or pulling the components apart,*

*wherein the detrimental-substance-containing component includes at least one fragile vial that fractures when at least a predetermined pressure is applied thereto, with said vial containing a detrimental substance that would damage an article attached to the device if the vial were to be fractured and the detrimental substance were to be released from the fractured vial onto the attached article;*

*wherein the detrimental-substance-containing component defines a head space for enabling limited axial movement of the pinhead;*

*wherein the pinhead includes a breaker element integral to and disposed on the pin so as to move parallel to the axial movement of the pinhead and having a surface for applying more than said predetermined pressure against the vial in response to the pinhead being moved in response to application to the two components of at least a predetermined threshold separation force that is nevertheless less than that required to overcome said predetermined retaining force, to thereby fracture the vial and release the substance contained therein before the components are separated by prying or pulling the components apart; and*

*wherein the vial is elongated with closed ends and is disposed in relation to the pinhead such that the breaker element can apply pressure to fracture the vial.*

* * * * *